United States Patent [19]

Ormond

[11] 4,191,350

[45] Mar. 4, 1980

[54] STORABLE HOLDER FOR A CONTAINER

[76] Inventor: William Ormond, 233 Hillcrest Ave., Hamilton, Canada, L8P 2X3

[21] Appl. No.: 901,641

[22] Filed: May 1, 1978

[51] Int. Cl.² .......................... A47F 5/00; A47K 1/08
[52] U.S. Cl. .............................. 248/293; 248/311.1 R
[58] Field of Search ............... 248/461, 130, 138, 293, 248/311.1, 311.1 A, 312, 314, 315, 103, 104, 206 A

[56] References Cited

U.S. PATENT DOCUMENTS

| D. 45,220 | 2/1914 | Altenberg | D7/70 |
|---|---|---|---|
| 882,854 | 3/1908 | Weaver | 248/311.1 X |
| 2,649,270 | 8/1953 | Franks | 248/311.1 |
| 2,754,078 | 7/1956 | Koger et al. | 248/293 X |
| 2,893,675 | 7/1959 | Smith et al. | 248/311.1 X |
| 2,903,225 | 9/1959 | Weinstein | 248/293 X |
| 2,904,299 | 9/1959 | Dalton | 248/293 |
| 2,926,879 | 3/1960 | Dietrich | 248/311.1 |
| 3,233,858 | 2/1966 | Benjamin | 248/311.1 |
| 3,556,453 | 1/1971 | Hall | 248/311.1 |
| 4,063,701 | 12/1977 | Wray | 248/293 |

*Primary Examiner*—Lawrence J. Staab
*Attorney, Agent, or Firm*—Hirons, Rogers & Scott

[57] ABSTRACT

A storable holder for a container such as a glass cup, mug, bottle or can, intended especially for use in boats and mobile homes consists of a recessed base, a yoke member and a ring member. The yoke member is pivoted by an axle to the base member and can be moved between stored and operative positions about a yoke axis, while the ring member is pivoted to the yoke member so as to assume a horizontal position under gravity when in the operative position. The ring member includes two flexible loops of ferromagnetic material (e.g. chain) depending therefrom at right angles to one another and joined together at the bottom so as to engage the bottom of a container in the ring and retain it in the holder. The yoke and ring are accommodated in the recess in the base in their stored positions, and the base includes a magnet against which the flexible loops are stored by magnetic attraction. The yoke axle is spring-urged and cooperates with a face cam to positively retain the yoke and ring members in both the stored and operative positions.

6 Claims, 5 Drawing Figures

U.S. Patent
Mar. 4, 1980
4,191,350
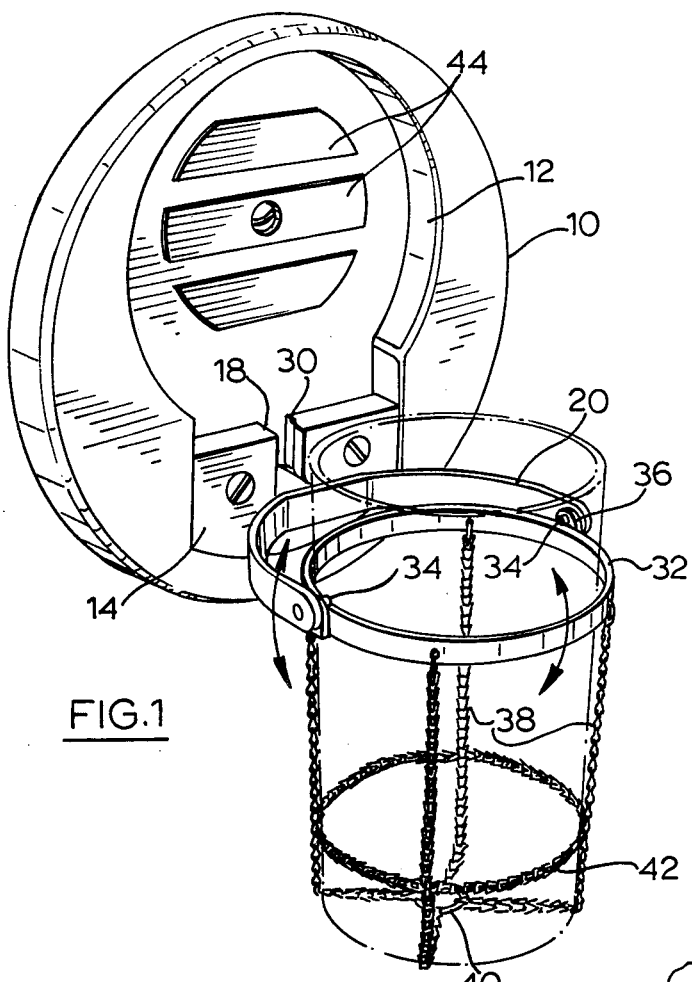
FIG.1
FIG.2
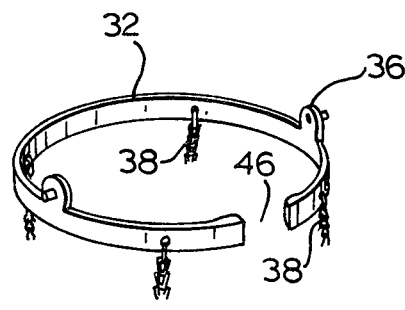
FIG.5
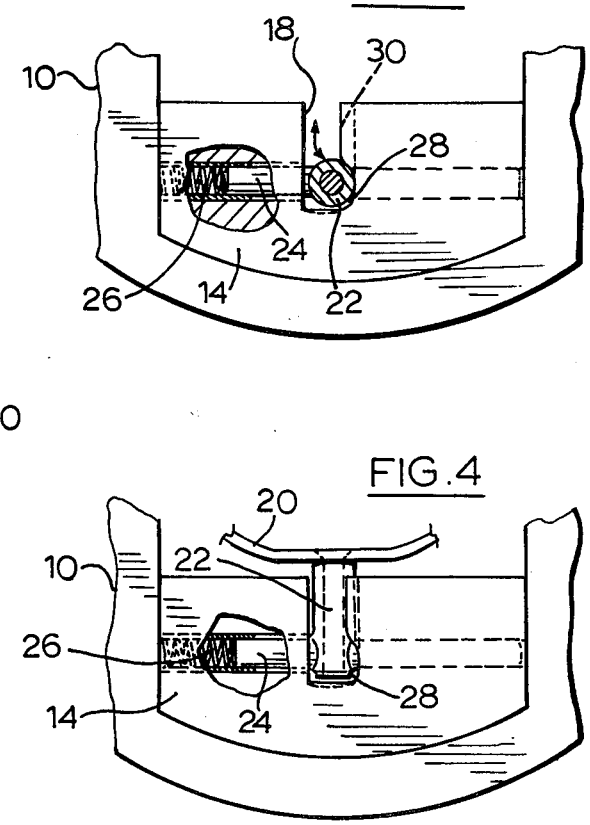
FIG.3
FIG.4

STORABLE HOLDER FOR A CONTAINER

FIELD OF THE INVENTION

This invention is concerned with improvements in or relating to storable holders for containers, such as glasses, cups, mugs, bottles and cans, of the type in which the part thereof receiving the container can be moved from a protruding operative position to a stored position, and vice versa.

REVIEW OF THE PRIOR ART

Numerous attempts have been made hitherto to provide a storable holder of the type with which the part receiving the container can be moved from a protruding operative position, in which the container can easily be slipped into and out of the holder, but in which the empty holder is a somewhat hazardous projection into the living space, to a stored position in which it lies alongside the surface on which it is mounted. Prior examples are described and claimed in U.S. Pat. Nos. 882,854; 2,649,270; 2,754,078 and 3,233,858. Such holders are particularly suited for example for use in boats and mobile homes, and it is then preferred that they should have some gimbal facility, at least transverse to the direction of movement of the vessel or vehicle, so as to avoid spillage with transverse rolling. Examples of this kind of holder are shown in U.S. Pat. Nos. 2,893,675; 2,926,879; 3,556,453 and U.S. Pat. No. Des. 45,220. A holder with gimbal pivoting presents special difficulty if it is to receive containers of different type and size and still be storable.

DEFINITION OF THE INVENTION

It is therefore an object of the invention to provide a new storable holder for containers and having gimbal facility.

It is another object to provide a new storable holder adapted to receive containers of different type and size.

In accordance with the present invention there is provided a new storable holder for containers, such as a glass, cup, mug, bottle or can, comprising:

a base member adapted for mounting on a surface;

a yoke member pivoted to the base member for movement about a yoke axis between a stored position in which it is alongside the base member and an operative position in which it extends from the base member;

a ring member pivoted to the yoke member about a ring axis and movable therewith between corresponding stored and operative positions, the ring member being urged by gravity in the operative position to a stable horizontal attitude;

the ring member comprising a rigid ring and at least one depending flexible loop like member including ferromagnetic material connected at its ends to the rigid ring and embracing the bottom of a container in the ring member to retain the container in the holder; and A magnet on the base member against which the loop can be retained by magnetic attraction of the ferromagnetic material when the yoke and ring members are in their stored positions.

The said ring member may include two flexible loops each connected at its ends to the rigid ring, disposed transversely to one another and connected together at their lowermost positions.

The base member may have a recess therein in which the yoke and ring members are disposed in their stored positions.

DESCRIPTION OF THE DRAWINGS

A storable holder for drink containers that is a particular preferred embodiment of the invention will now be described, by way of example, with reference to the accompanying diagrammatic drawing, wherein:

FIG. 1 is a general perspective view of the holder showing the container holder in operative position, FIG. 2 is a general perspective view showing the container holder in the stored position, FIG. 3 is section on the line 3—3 of FIG. 1, with part broken away to show the operation of the container holder retainer, FIG. 4 is a similar view to FIG. 3, but with the container holder in the stored position, and FIG. 5 is a part view similar to FIG. 1 showing a modification to permit use of the holder with a handled container, such as a mug.

DESCRIPTION OF THE PREFERRED EMBODIMENTS

The specific example of a storable holder illustrated herein has a base member 10 of circular shape, although it can of course be of any other decorative shape, by which the holder can be attached to any suitable approximately vertical surface. The base member is provided with a recess 12 of approximately key-hole shape, the lower end of which is provided with a removable plate 14, providing a tubular recess 16 and having a vertical slot 18 therein. A holder yoke member 20 is mounted on arm 22, which is in turn mounted on a transverse axle 24, by which the arm and yoke are mounted for pivoting movement about a yoke axis between a protruding operative position shown in FIGS. 1 and 3, and a stored position shown in FIGS. 2 and 4. The axle 24 is urged by a spring 26 along its axis so that the arm 22 is held in engagement with a face cam provided by one wall of the recess 18. Thus the wall has a recess 28 into which the arm 22 snaps in the operative position, and a recess 30 into which the arm snaps in the stored position, so that the yoke member is retained firmly in these positions, and snaps from one position to the other when moved by the operator.

A ring member 32 is pivoted to pivot pins 34 at the ends of the arms of the yoke 20 about a respective ring axis, the pins engaging in lugs 36 which extend upwards from one circular edge of the ring, so that the ring is urged by gravity when in the operative position to a stable horizontal attitude, as illustrated in FIG. 1. The holder illustrated does not therefore have full gimbal capacity about two axes at right angles, although such could easily be provided, if required, by suitably pivoting another ring inside the ring 32. This type of full gimbal capacity is not usually required for reasons that will be explained below.

The ring member also includes two depending flexible loops 38, e.g. of small link chain, fastened at their upper ends to the ring 32 so as to be at right angles to one another, and fastened together at their lowermost parts by a ring 40. They are also fastened together by a flexible ring 42 parallel to and below the rigid ring 32 and connected to each depending loop at two corresponding locations. The loops 38 and rings 40 and 42 together form, in effect, a flexible open-ended cage which will receive the bottom end of any size or shape of container that slips sufficiently easily into the ring and closely embraces the bottom end and retains it in the ring. The flexibility of this cage will allow a small amount of movement of the container parallel to the ring axis, quite sufficient for the relatively smaller pitching movement of a vessel or vehicle, while the larger rolling movement is accomodated by the pivoting of the ring member to the yoke member. It will be appreciated that a single loop 38 can be employed, in which case the ring 42 may need to be rigid, although preferably at least 1½ loops are provided, and more preferably still the two loops illustrated.

Such a construction avoids the problems encountered with prior art proposals in which the container must either fit firmly into the rigid ring 32, which means usually that it can only be used with one type of container, or alternatively, if it stands on a rigid base support while passing freely through the ring, it will jerk from side to side of the ring with movement of the vessel or vehicle, which is quite undesirable.

When the yoke and ring are moved to the stored position they are accomodated within the recess 12, so that they no longer protrude into the living space, and the flexible loops 38 will hang down along the face of the base member close thereto. The storage of the flexible cage is facilitated, and the general operation and appearance of the device rendered even more attractive, as illustrated by FIG. 2, by arranging that the cage includes at least some ferromagnetic material, and a magnet 44, (or as illustrated several magnetic pieces 44), is attached to the bottom of the recess. The flexible cage will then be held by the magnet or magnets in the recess, and so that it will not move with movement of the vessel, etc. The attraction of the flexible material to the magnet is just sufficient for adequate retention as described, without hindering the movement of the yoke and ring members back to the operative positions. Conveniently all of the flexible loops 38 and rings 40 and 42 are of ferromagnetic material, such as small link steel chain, with a suitable protective and/or decorative coating if desired, but it will be sufficient if only a few links are ferromagnetic or, as a minimum, the ring 40 only need be ferromagnetic and can provide sufficient retention.

FIG. 4 shows a modification necessary to permit the holder to be used with a handled mug or cup. The ring 32 is provided with a gap 46 through which the mug or cup handle can pass, the parts of the ring immediately adjacent the gap being thickened to preserve the balance of the ring about its axis so that it will maintain its stable neutral position. Usually this stable neutral position will be horizontal, but since the ring is only pivoted about a single axis it will be understood that the position may not be horizontal transverse to the ring axis, and therefore cannot correctly be referred to in the claims as horizontal.

I claim:

1. A storable holder for a container, such as a glass, cup, mug, bottle or can comprising:
    a base member adapted for mounting on a surface;
    a yoke member pivoted to the base member for movement about a yoke axis between a stored position in which it is alongside the base member and a operative position in which it extends from the base member;
    a ring member pivoted to the yoke member about a ring axis and movable therewith between corresponding stored and operative positions, the ring member being urged by gravity in the operative position to a stable horizontal attitude;
    the ring member comprising a rigid ring and at least one depending flexible loop-like member including ferromagnetic material connected at its ends to the rigid ring and embracing the bottom of a container in the ring member to retain the container in the holder; and
    a magnet on the base member against which the loop-like member can be retained by magnetic attraction of the ferromagnetic material when the yoke and ring members are in their stored positions.

2. A storable holder as claimed in claim 1, wherein said ring member comprises two flexible loops each connected at its ends to the rigid ring, disposed transversely to one another and connected together at their lowermost positions.

3. A storable holder as claimed in claim 2, wherein the ring member comprises a flexible ring parallel to and below the rigid ring and connected to each depending loop at two corresponding locations.

4. A storable holder as claimed in any one of claims 1, 2 or 3, wherein the base member has a recess therein in which the yoke and ring members are disposed in their stored positions.

5. A storable holder as claimed in any one of claims 1, 2 or 3, wherein the rigid ring has a gap therein through which can pass the handle of a cup to be retained in the holder.

6. A storable holder as claimed in any one of claims 1, 2 or 3, wherein the yoke member comprises an arm protruding from an axle about which the yoke member rotates, a spring urging the axle for longitudinal movement along the yoke axis, and a cam member against which the arm is urged by the spring, the cam providing respective locating recesses into and out of which the arm moves by said longitudinal movement of the axle to retain the yoke member in its stored and operative positions.

* * * * *